United States Patent
Vaisman et al.

(10) Patent No.: US 9,885,283 B2
(45) Date of Patent: Feb. 6, 2018

(54) GAS TURBINE ENGINE DRIVEN BY SUPERCRITICAL POWER GENERATION SYSTEM

(71) Applicant: Rolls-Royce Corporation, Indianapolis, IN (US)

(72) Inventors: Igor Vaisman, Carmel, IN (US); Thomas E. Bastnagel, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 295 days.

(21) Appl. No.: 14/729,318

(22) Filed: Jun. 3, 2015

(65) Prior Publication Data
US 2015/0354450 A1   Dec. 10, 2015

Related U.S. Application Data

(60) Provisional application No. 62/007,995, filed on Jun. 5, 2014.

(51) Int. Cl.
| | |
|---|---|
| *F02C 3/13* | (2006.01) |
| *F02C 1/10* | (2006.01) |
| *F02C 3/04* | (2006.01) |
| *F02C 7/08* | (2006.01) |
| *F02C 7/143* | (2006.01) |
| *F02K 3/06* | (2006.01) |
| *F02K 3/077* | (2006.01) |

(Continued)

(52) U.S. Cl.
CPC ............ *F02C 3/13* (2013.01); *F01K 25/103* (2013.01); *F02C 1/10* (2013.01); *F02C 3/04* (2013.01); *F02C 7/08* (2013.01); *F02C 7/143* (2013.01); *F02K 3/06* (2013.01); *F02K 3/077* (2013.01); *F22B 3/08* (2013.01); *F25B 9/008* (2013.01); *F25B 27/00* (2013.01); *F05D 2210/10* (2013.01); *F05D 2210/12* (2013.01); *F05D 2210/20* (2013.01); *F05D 2220/32* (2013.01); *F05D 2260/213* (2013.01); *F25B 9/06* (2013.01); *F25B 2309/061* (2013.01); *F25B 2327/00* (2013.01); *Y02T 50/675* (2013.01)

(58) Field of Classification Search
CPC ...... F02C 3/04; F02C 3/13; F02C 1/10; F02C 7/08; F02C 7/143; F22B 3/08
See application file for complete search history.

(56) References Cited

U.S. PATENT DOCUMENTS 2,392,623 A * 1/1946 Traupel ................... F02C 1/10
                                                      60/684
2,820,348 A * 1/1958 Sauter ..................... F02C 1/10
                                                      165/103

(Continued)

FOREIGN PATENT DOCUMENTS

EP           2272757 A2      1/2011

OTHER PUBLICATIONS

European Search Report.

*Primary Examiner* — Pascal M Bui Pho
*Assistant Examiner* — Eric Linderman
(74) *Attorney, Agent, or Firm* — Fishman Stewart PLLC (57) ABSTRACT

A gas turbine engine includes a shaft having a first air compressor coupled thereto, a combustor positioned to receive compressed air from the first compressor, and a power source coupled to the shaft, the power source powered by a working fluid other than the compressed air.

14 Claims, 5 Drawing Sheets

(51) Int. Cl.
  *F01K 25/10* (2006.01)
  *F22B 3/08* (2006.01)
  *F25B 9/00* (2006.01)
  *F25B 27/00* (2006.01)
  *F25B 9/06* (2006.01)

(56) References Cited

U.S. PATENT DOCUMENTS

| | | | |
|---|---|---|---|
| 3,816,751 A | 6/1974 | Jampen et al. | |
| 3,971,211 A | 7/1976 | Wethe et al. | |
| 4,267,692 A * | 5/1981 | Earnest | F01K 23/10 60/39.181 |
| 4,509,324 A * | 4/1985 | Urbach | F01K 21/047 60/39.17 |
| 5,131,231 A * | 7/1992 | Trimble | F02C 1/10 60/649 |
| 5,813,215 A | 9/1998 | Weisser | |
| 6,606,864 B2 * | 8/2003 | MacKay | F02C 1/06 60/39.41 |
| 6,644,062 B1 | 11/2003 | Hays | |
| 6,848,249 B2 * | 2/2005 | Coleman | F02C 3/13 60/39.17 |
| 7,685,820 B2 | 3/2010 | Litwin et al. | |
| 7,966,868 B1 * | 6/2011 | Sonnichsen | F01D 25/285 73/112.01 |
| 9,410,478 B2 * | 8/2016 | Loebig | F02C 7/143 |
| 9,540,999 B2 * | 1/2017 | Stapp | F02C 3/04 |
| 2002/0078689 A1 * | 6/2002 | Coleman | F02C 3/13 60/728 |
| 2002/0134085 A1 * | 9/2002 | Frutschi | F01K 25/103 60/772 |
| 2005/0279098 A1 * | 12/2005 | Kung | F01K 21/00 60/670 |
| 2007/0125063 A1 * | 6/2007 | Evulat | F02C 6/10 60/39.15 |
| 2011/0252796 A1 * | 10/2011 | Burkhart | F01K 27/00 60/641.2 |
| 2012/0023957 A1 | 2/2012 | Draper et al. | |
| 2013/0111917 A1 * | 5/2013 | Ho | F02C 7/00 60/773 |
| 2013/0180259 A1 * | 7/2013 | Stapp | F02C 3/04 60/773 |
| 2013/0187007 A1 * | 7/2013 | MacKin | F02C 6/08 244/134 R |
| 2013/0239542 A1 * | 9/2013 | Dasgupta | F02C 7/143 60/39.093 |
| 2013/0269334 A1 * | 10/2013 | Sonwane | F02C 1/10 60/525 |
| 2014/0352317 A1 * | 12/2014 | Loebig | F02C 7/143 60/772 |
| 2016/0369746 A1 * | 12/2016 | Armstrong | F02C 3/10 |
| 2017/0022844 A1 * | 1/2017 | Bastnagel | F01K 23/08 |
| 2017/0058834 A1 * | 3/2017 | Vaisman | F02K 3/06 |
| 2017/0101931 A1 * | 4/2017 | Armstrong | B64D 27/10 |

* cited by examiner

FIG. 8

GAS TURBINE ENGINE DRIVEN BY SUPERCRITICAL POWER GENERATION SYSTEM

CROSS-REFERENCE TO RELATED APPLICATIONS

This application claims priority to U.S. Provisional Patent Application No. 62/007,995 filed Jun. 5, 2014, the contents of which are hereby incorporated in their entirety.

FIELD OF TECHNOLOGY

An improved apparatus and method of operating a gas turbine engine includes providing power to a shaft of the gas turbine engine using carbon dioxide ($CO_2$) operated in super-critical cycle.

BACKGROUND

It has become increasingly desirable to reduce the size of power-producing or thrust-producing devices such as gas turbine engines. Gas turbine engines typically include one or more shafts that include compressors, bypass fans, and turbines. Typically, air is forced into the engine and passed into a compressor. The compressed air is passed to a combustor, and at high temperature and pressure the combustion products are passed into a turbine. The turbine provides power to the shaft, which in turn provides the power to the compressor and bypass fan or gearbox. Thrust is thereby produced from the air that passes from the bypass fan, as well as from the expended in the turbine combustion products.

However, air can be thermodynamically inefficient, especially during cruise operation of the engine (such as in an aircraft). Air that enters the engine is of low pressure, therefore low density. In order to reach the needed pressure and temperature at the combustor exit, the air is compressed to very high pressure ratios and heated up to very high temperatures in the combustors. In order to provide adequate mass flow rate, significant volume flow rate of the low density air is pumped through high pressure ratio consuming significant amount of power. As a result the engines are made of large and heavy components, consume large amount to fuel, and may include significant operational and maintenance expenses to cope with high combustion temperatures.

Some gas turbine engines include multiple stages and shafts to further improve thermodynamic efficiency. That is, some systems may include various compression stages that increase the pressure in each stage, providing very high pressure ratios that is passed to combustion, and expansion of the combustion products may also be through multiple stages, as well. For instance, a gas turbine may have Low Pressure (LP) and High Pressure (HP) shafts that correspond with respective LP and HP compressors and turbines, further improving the thermodynamic efficiency over a single stage engine. Or, such systems may include multiple compression and expansion stages.

One known option includes using an intercooler, to further improve thermodynamic efficiency by cooling the compressed air between compression stages (i.e., between LP and HP compressors). In fact, many gas turbine engines have been designed and implemented to improve thermodynamic efficiency.

However, these known gas turbine engines use air as an incoming working fluid that is used in the combustion process. As such, although known gas engines have made great strides in improving thermodynamic efficiency, such systems face a fundamental challenge of low density incoming air that is compressed in very high pressure ratios and heated up to very high temperatures. This fundamental challenge results in gas turbine engines that are generally quite large, to accommodate the large compression ratios. Such large components result in overall aircraft efficiencies because of the large amounts of mass that are used to build the engines, to meet the material needs for such large pressure ratios and high combustion temperatures.

As such, there is a need to improve thermodynamic efficiency and reduce overall mass in gas turbine engines.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine is described herein, and various embodiments thereof. According to the disclosure, a gas turbine engine uses a power source to provide power to the shaft, reducing the pressure ratio while providing adequate power and thrust for aircraft and other purposes.

Figure 1:
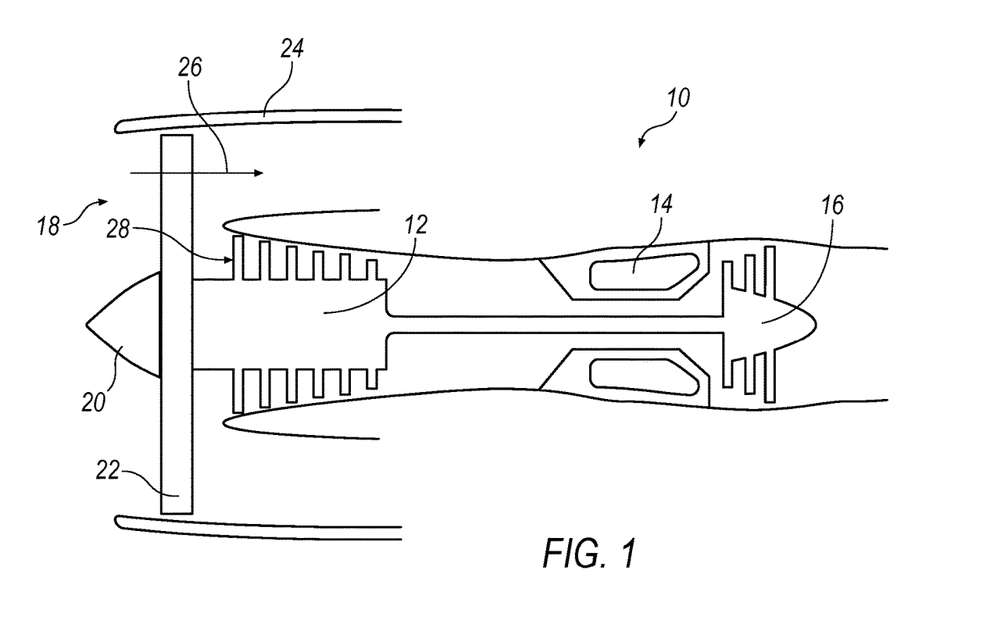
FIG. 1 is the prior art and an illustration of a conventional gas turbine engine.

FIG. 1 illustrates a schematic diagram of a gas turbine machine 10 that is a primary mover or thrust source for an aircraft. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. The engine provides two major functions:

propulsion and power generation used to rotate the compressors, turbines, and the bypass fan. The major function, propulsion, includes fairly low air pressures and temperatures, which are approximately equal to the pressures and temperatures exiting the gas turbine engine. However, the air pressure ratios and temperatures generated in the gas turbine engine are relatively very high. The high pressure ratios and temperatures are needed to provide the power generation function. In one known example, an engine has a pressure of 180 psia and a temperature of 1600° F. at the combustor exit and pressure of 25 psia and temperature of 1000° F. at the last turbine exit provided that the pressure at the engine inlet is 15 psia. This means that the propulsion requires pressure ratio of 25/15=1.67, when the total pressure ratio in the engine is 180/15=12 covers power for both propulsion and power generation devices. In some known engines the difference in pressure ratios and combustion temperatures may be even greater.

The propulsion and power generation functions may be considered split from one another and a power source is assumed present. Therefore, the engine design significantly simplifies as illustrated in FIG. 2.

Figure 2:
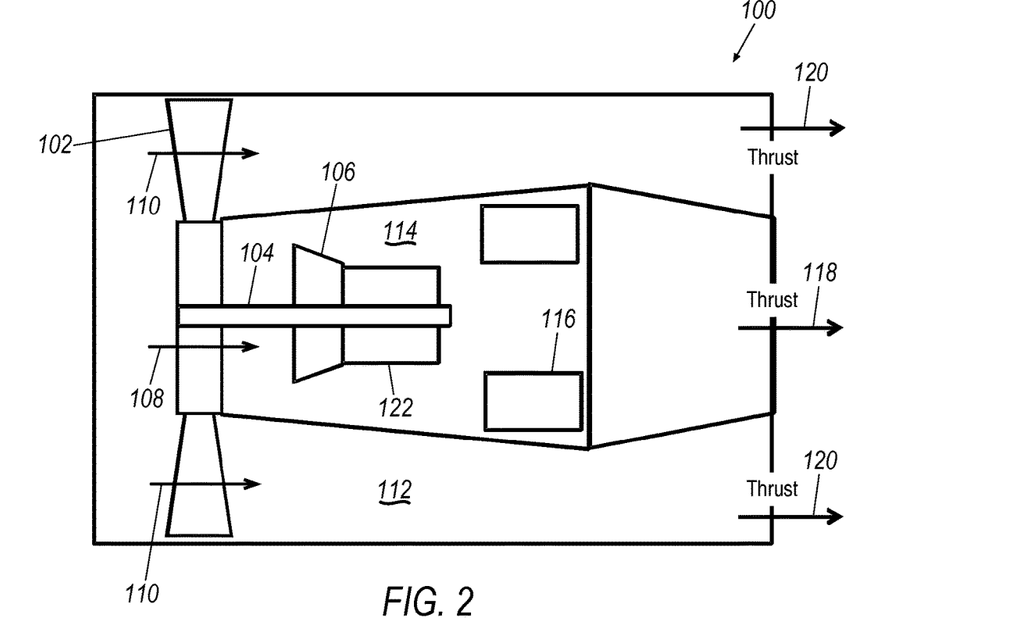
FIG. 2 is an illustration of a gas turbine engine with split propulsion and power generation functions which is an intermediate step to introduce a gas turbine engine driven by s-CO2 power generation cycle.

FIG. 2 is an illustration of a gas turbine engine which employs a power source 122. Engine 100 includes a fan 102 coupled to a shaft 104. A compressor 106 is coupled to shaft 104 and is positioned to receive air 108 that passes from fan 102 to compressor 106. Fan 102 also causes bypass air 110 to pass externally 112 to and to region 114 in which fuel is combusted with air 108 in a combustor 116. That is, air 108 passes through compressor 106, to combustor 116 as pressurized air, and combustion products from combustor 116 cause a thrust 118. Thrust 120 is also provided to engine 100 by bypass air 110.

A power source 122 powers compressor 106 and bypass fan 102 via shaft 104 and the compressor and the fan produce thrust. Shaft 104 of engine 100 is separately powered by power source 122, avoiding the extraction of energy from the combustion products from combustor 116 via, for instance, a turbine as shown on FIG. 3. As such, the enthalpy stream from combustor 116 is available to generate thrust 118, without extraction first through a turbine as in a conventional gas turbine engine.

In one example, a gas turbine engine with such a power source needs pressure of 25 psia and temperature of 1000° F. at the combustor exit provided that the pressure at the engine inlet is approximately 15 psia. In this case the total pressure ratio in the engine is 25/15=1.67, which means that power requirements for the power source is substantially lower than the power requirements for some known engines, which includes a pressure ratio equal to 12 as mentioned above. Also, temperature exiting the combustor may be reduced, in one example, from 1600° F. to 1000° F.

Known engines include one or more turbines attached to one or more shafts, which extract enthalpy from the combustion products. Accordingly, compressors and turbines are relatively large, to accommodate the excessive temperatures and pressures in the very high pressure-ratio operation.

According to the disclosure, a s-CO2 power generation cycle implements functions of the power source. The closed circuit s-CO2 power generation system extracts power from a working fluid such as carbon dioxide by operating in a super-critical cycle.

Super-critical carbon dioxide (s-$CO_2$) systems provide significantly improved efficiencies compared to Brayton and other air-based systems by operating in a super-critical region, known as a temperature and pressure that exceed the critical point. That is, a phase-diagram of $CO_2$, as is commonly known, includes a "triple point" as the point that defines the temperature and pressure where solid, liquid, and vapor meet. Above the triple point the fluid can exist in liquid, vapor, or in a mixture of the both states. However, at higher temperature and pressure, a critical point is reached which defines a temperature and pressure where gas, liquid, and a super-critical region occur. The critical point is the top of the dome made up of the saturated liquid and saturated vapor lines. Above the critical point is the gaseous region.

A super-critical fluid occurs, as stated, at temperatures and pressures above the critical point, where distinct liquid and gas phases do not exist. Close to the critical point and in the super-critical region, small changes in pressure or temperature result in large changes in density, allowing many properties of the super-critical fluid to be fine-tuned, and providing a tremendous opportunity for high power energy extraction and in a small footprint relative to, for instance, an air-based thermodynamic system (such as a Brayton cycle).

Any fluid has a triple point, a critical point, saturated liquid and vapor lines, and a super-critical region. One in particular, carbon dioxide, is particularly attractive for such operation due to its critical temperature and pressure of approximately 31° C. and 73 atmospheres, respectively, as well as due to its lack of toxicity. Thus, s-$CO_2$-based systems may be operated having very dense super-critical properties, such as approximately 460 kg/m$^3$. The excellent combination of the thermodynamic properties of carbon dioxide may result in improved overall thermodynamic efficiency and therefore a tremendously reduced system size.

Due to the compact nature and high power density of power source 122 that is powered with a super-critical cycle, the overall size of engine 100 is significantly reduced, as well.

As such, thrust 118 obtained as a result of combustion in combustor 116 occurs at a low pressure and temperature when compared to a conventional gas turbine engine. Thrust 118, in combination with thrust 120 from bypass air 110, provides an overall thrust in an engine that is significantly reduced in size compared to a size of a conventional gas turbine engine. Such overall size reduction is due at least to the high power density available in power source 122, in combination with the significantly reduced pressure requirements in an engine that does not include turbines coupled to a shaft, such as shaft 104.

Thus, gas turbine engine 100 includes shaft 104 having compressor 106 coupled thereto. Combustor 116 is positioned to receive compressed air from compressor 106, and power source 122 is coupled to shaft 104. Power source 122 is powered by a working fluid (or a mixture of fluids) other than the compressed air, such as a solvent that may include, in one example, carbon dioxide as the working fluid. Various examples of engine 100 with power source 122 may be implemented, as will be further illustrated.

Figure 3:
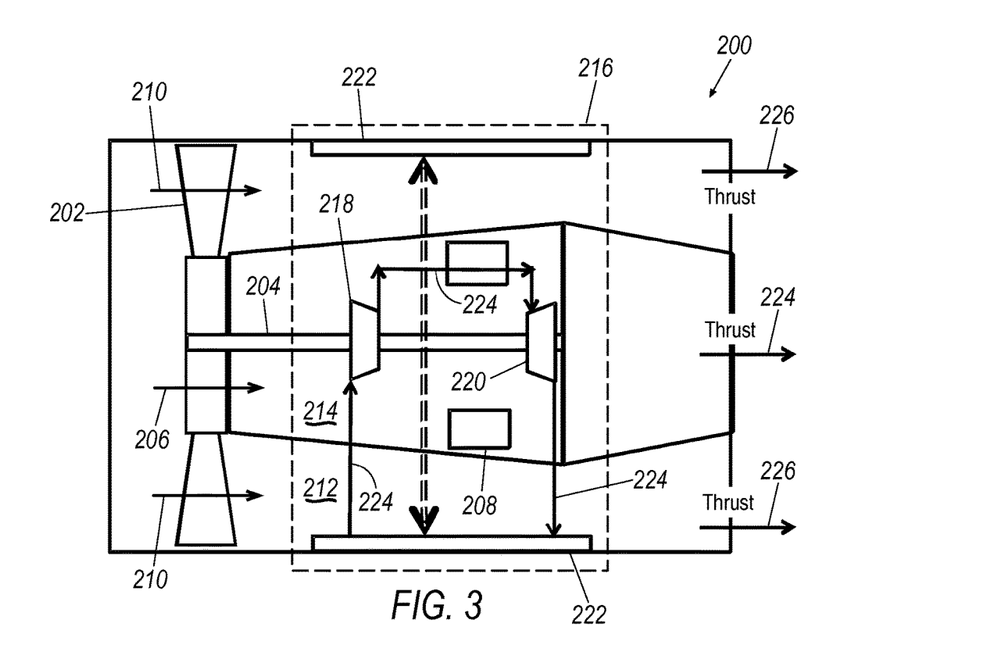
FIG. 3 is an illustration of a gas turbine engine in which a fan provides compressed air to a combustor.

FIG. 3 is an illustration of a s-$CO_2$-based device or gas turbine engine 200 that includes a fan 202 coupled to a shaft 204. Engine 200 in this example does not include an air compressor per se, such as compressor 106 illustrated in FIG. 2, but instead fan 202 causes air 206 to pass into a combustor 208, while also causing bypass air 210 to pass externally 212 to a region 214 in which fuel is combusted with air 206. As such, air 206 is compressed to a degree and sufficient to cause air flow to combustor 208, and in this regard fan 206 may be considered itself to be a compressor.

Gas turbine engine 200 includes a power source 216, which includes a working fluid compressor 218 coupled to shaft 204. A working fluid turbine 220 is coupled to shaft 204, and a heat rejection heat exchanger 222 is positioned in thermal contact with bypass air 210 that passes through region 212. Lines 224 form a closed circuit that interconnect, such that a working fluid passes through heat rejection heat exchanger 222, to compressor 218, and through combustor 208. The working fluid passes from combustor 208 to turbine 220, where it returns to heat rejection heat exchanger 222. The working fluid, such as carbon dioxide, thus operates in super-critical mode by maintaining the temperature and pressure above the critical temperature and pressure.

Thus, in operation, power source 216 provides power to shaft 204 by receiving thermal power via the working fluid passing combustor 208, and imparting the power therefrom to the shaft via turbine 220 in which a pressure drop of the working fluid occurs. Heat is rejected from the working fluid in heat rejection heat exchanger 222, which is itself cooled with bypass air 210. Turbine 220 expands the working fluid while causing shaft 204 to rotate, which provides rotational power to fan 202 (producing air stream 206 and bypass air 210), while providing power to compressor 218 in which the working fluid is compressed, resulting in thrust 224 from combustor 208, as well as thrust 226 from bypass air 210.

Figure 4:
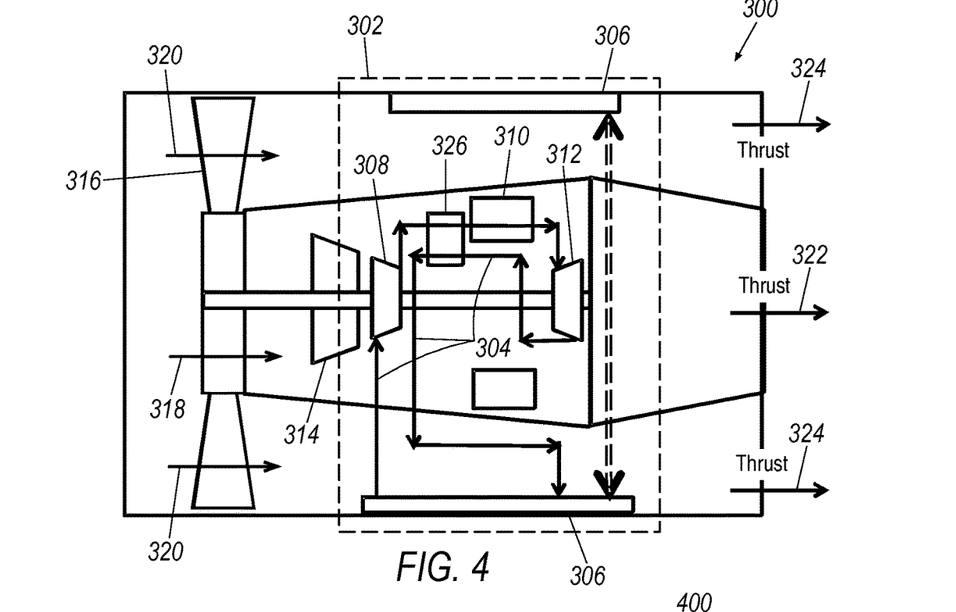
FIG. 4 exemplary gas turbine engine that includes a recuperative heat exchanger for the working fluid.

FIG. 4 is an illustration of a s-$CO_2$-based device or gas turbine engine 300 that includes a power circuit 302 in which lines 304 pass a working fluid in a closed circuit from a heat rejection heat exchanger 306, to a working fluid compressor 308, to a combustor 310, and to a working fluid turbine 312 for expansion and power extraction to the shaft. In this example, an air compressor 314 compresses air from a fan 316, which provides combustion air 318 and bypass air 320. As such, combustion air 318 passes from fan 316, to compressor 314, and to combustor 310, providing a thrust 322, while bypass air 320 passes to heat rejection heat exchanger 306, providing a thrust 324.

However, in this example, power circuit 302 includes a recuperative heat exchanger 326 through which lines 304 pass. Recuperative heat exchanger 326 receives the working fluid from compressor 308, and also from an outlet of turbine 312, improving overall thermodynamic efficiency of power circuit 302 by recuperating heat from the combustion process before rejecting the heat in heat rejection heat exchanger 306.

Figure 5:
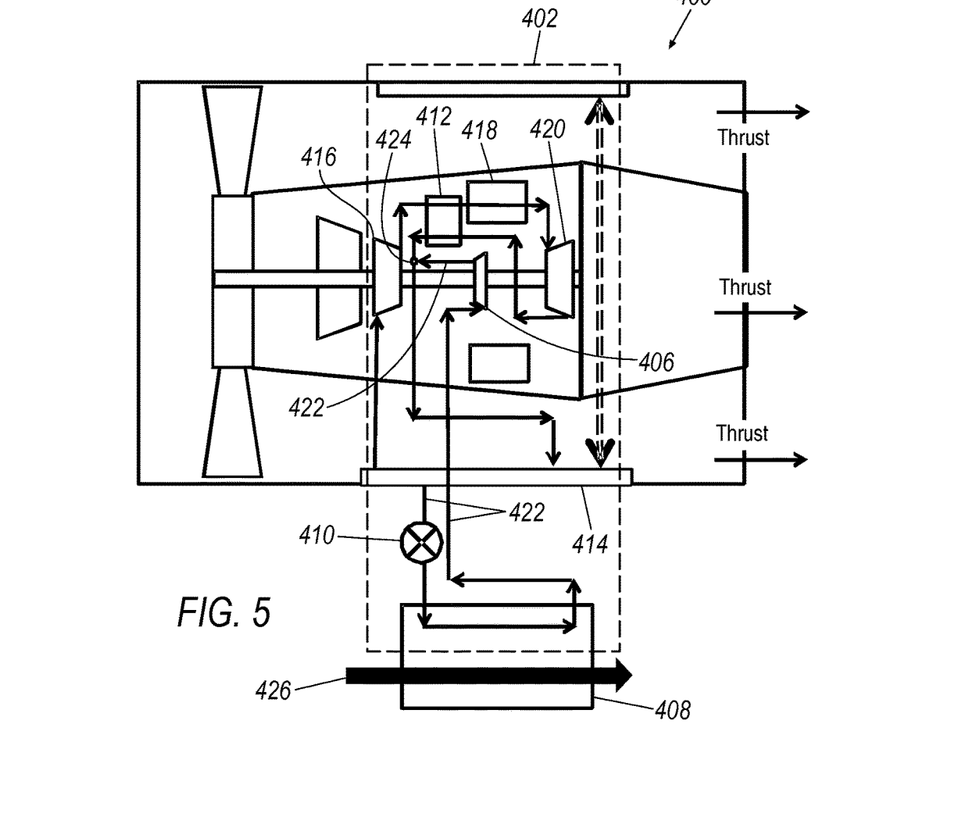
FIG. 5 is an illustration of an exemplary gas turbine engine that includes a cooling cycle for providing cooling via the working fluid.

FIG. 5 is an illustration of a s-$CO_2$-based device or gas turbine engine 400 having a power circuit 402 that operates a working fluid in super-critical mode, as described in previous examples. However, in this example, power circuit 402 is combined with a cooling circuit operating on the same fluid and includes an additional working fluid compressor 406, as well as an evaporator 408 and an expansion valve 410. Engine 400 includes, in this example, a recuperative heat exchanger 412, although it is contemplated that power circuit 402 may not include recuperative heat exchanger 412.

In operation, the working fluid passes from a heat rejection heat exchanger 414, to a working fluid compressor 416, to recuperative heat exchanger 412, to a combustor 418, to a working fluid turbine 420, back to recuperative heat exchanger 412, and to heat rejection heat exchanger 414. However, in this example, power circuit 402 includes a separate trans-critical circuit to provide cooling for components that may include electronics, aviation control units of an aircraft, refrigeration systems, and the like. That is, the cooling circuit may operate trans-critically (that is, operating both trans-critically and sub-critically in the circuit) to cool air in a flight deck, a passenger compartment, or electronics, as examples. Alternatively the circuit can cool any of those or all of those via a coolant, which could be PAO, water, a water glycol mixture, or any other secondary refrigerant. Objects to be cooled, such as electronic devices, may be mounted on cold plates, which has channels for boiling refrigerant to execute direct cooling by the refrigerant. The system may have multiple condensers using the same or different heat sinks. Also, the system may have multiple evaporators using the same or different heat sources and loads.

Lines 422 pass the working fluid to expansion valve 410, to evaporator 408, and to the additional working fluid compressor 406. The additional working fluid compressor 406 thereby provides compression to the working fluid before rejoining at point 424, and then passing back to heat rejection heat exchanger 414.

In such fashion, power circuit 402 thereby not only provides power for operation of engine 400 as previously described, but also provides a circuit in which a stream of the working fluid may be diverted to provide a cooling capability in evaporator 408 in which a warm stream of air 426 may be cooled. In other words, heat rejection heat exchanger 414 thereby provides a heat sink for not only operation of the power cycle, but also for rejection of heat from a low temperature stream of warm air 426 that is itself warmed with waste heat from electronics and the like.

In one embodiment the gas turbine engine may have only a heat rejection portion of the gas turbine engine cooling system, which includes at least one compressor of the cooling system and/or the heat rejection exchanger or their plurality.

Figure 6:
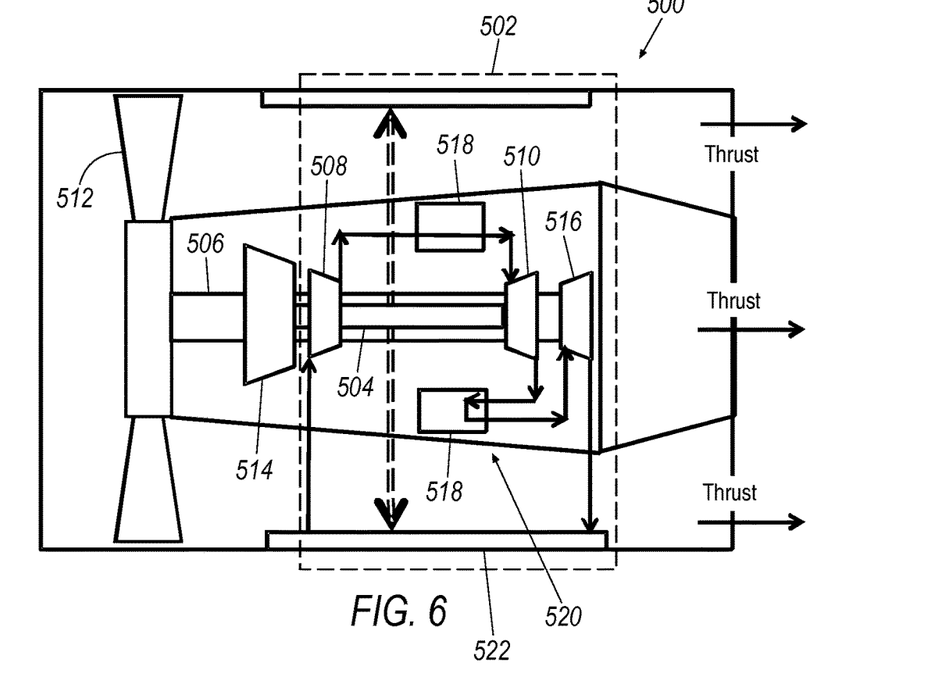
FIG. 6 is an illustration of an exemplary gas turbine engine that includes two working shafts and a reheat cycle.

FIG. 6 is an illustration of a s-$CO_2$-based device or gas turbine engine 500 that includes a power circuit 502. Engine 500, in this example, includes a first shaft 504 and a second shaft 506. First shaft 504 includes a working fluid compressor 508, as well as to an air compressor 514, and a first working fluid turbine 510. Second shaft 506 is coupled to a fan 512 and a second working fluid turbine 516. A combustor 518 serves also as a location for reheating 520 the working fluid as it passes from the first working fluid turbine 510 to the second working fluid turbine 516 but at a lower pressure. As such, air compressor 514 and working fluid compressor 508, receive power through shaft 504 via working fluid turbine 510, and the working fluid after reheat 520 further provides power to second shaft 506 via second working fluid turbine 516. In such fashion and as previously described, heat from a super-critically operating power circuit is rejected to a heat rejection heat exchanger 522, which itself is cooled using bypass air of the engine 502.

Figure 7:
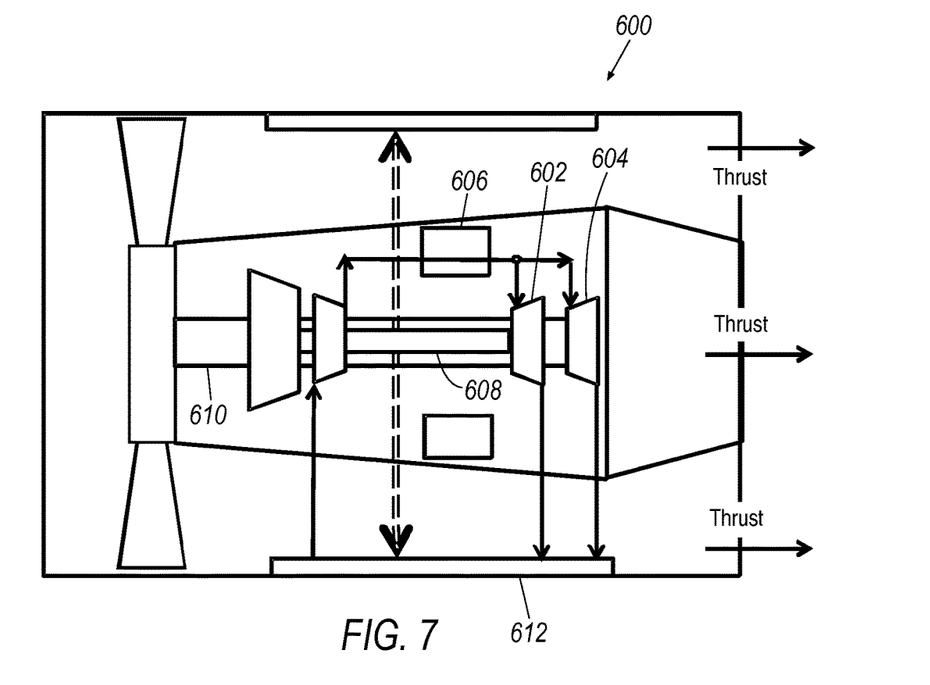
FIG. 7 is an illustration of an exemplary gas turbine engine that includes two working shafts and a working fluid that powers each using the working fluid at the same pressure.

FIG. 7 is an illustration of a s-$CO_2$-based alternative two-shaft device or engine design 600 similar to that of FIG. 6, but with two parallel turbines or expanders. However, in this example, instead of providing a reheat cycle of the super-critical working fluid between working fluid turbines 602, 604, the working fluid is extracted at essentially the same pressure as it exits a combustor 606, providing power via each working fluid turbine 602, 604 to respective shafts 608, 610, before rejecting heat to a heat rejection heat exchanger 612.

Thus, both FIGS. 6 and 7 provide alternative examples in which the overall thermodynamic efficiency may be improved by extracting energy to one shaft and then reheating (FIG. 6) at a lower pressure, or by extracting the working fluid at approximately the same pressure and powering two shafts with the working fluid at approximately the same pressure.

In one embodiment the gas turbine engine may have a combination of multi-stage turbines with reheat and turbines connected in parallel.

Figure 8:
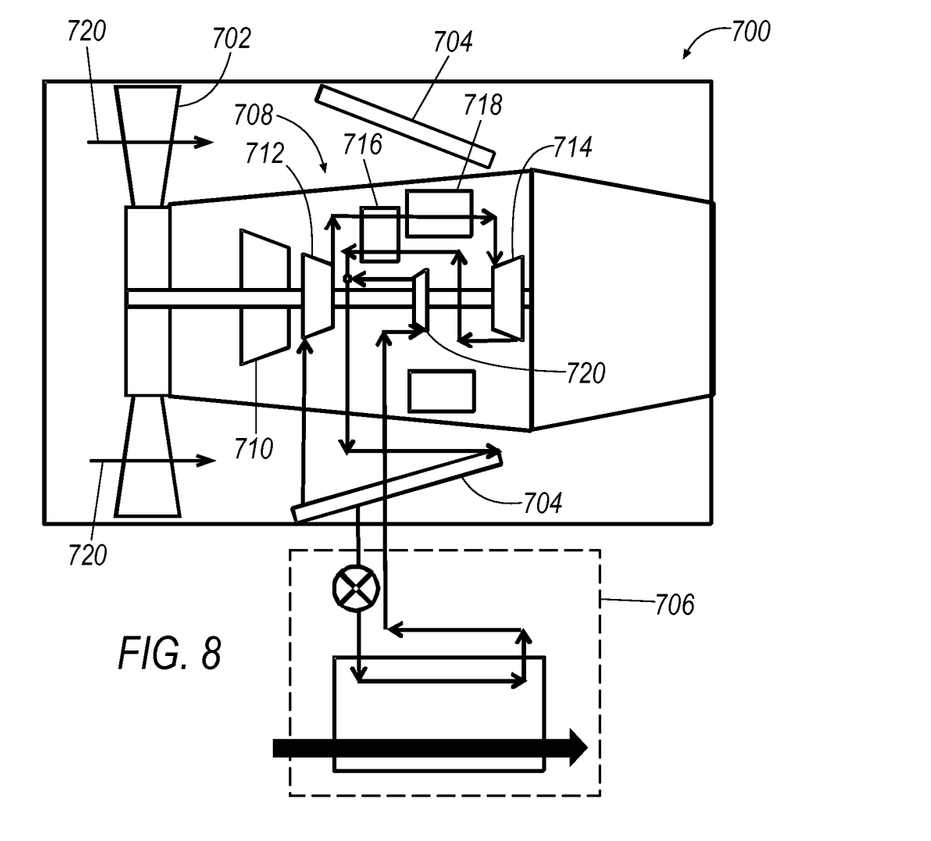
FIG. 8 illustrates a s-$CO_2$-based device or power pod that also includes a trans-critical $CO_2$ cycle.

FIG. 8 illustrates a s-$CO_2$-based device or power pod 700 that also includes a trans-critical $CO_2$ cycle, similar to that of FIG. 5. In this example, a fan 702 provides cooling to heat rejection heat exchangers 704, which themselves pass a working fluid through both a trans-critical $CO_2$ circuit 706 as well as a power producing circuit 708. Device 700 includes components according to the previously described examples, such as an air compressor 710, a working fluid compressor 712, a working fluid turbine 714, a recuperative heat exchanger 716, and combustor 718. Cooling circuit 706 includes an additional working fluid compressor 720 used for compressing the working fluid in circuit 706. It is contemplated, however, that other combinations of previous examples may be used in pod 700, such as the two-shaft examples of FIGS. 6 and 7, as examples.

Pod 700 may be used for providing power to a device other than an aircraft, such as in a land-based application. Because there is no thrust for such a pod, and power is thereby extracted via the shaft, the thermodynamic efficiency of pod 700 can be improved compared to an engine used for aircraft purposes. That is, by disposing the heat rejection heat exchangers 704 in the path of bypass air 720, flow is obstructed to a degree, causing an increase in the convection that occurs thereover. As such, pod 700 is available as a high power density engine for use in a land-based application, such as a vehicle or generator. Further, and because of the option for cooling circuit 706, cooling may thereby be provided as well that is available for use with respect to pod 700.

In one embodiment the gas turbine engine may be designed as a flying Pod which in addition generates thrust sufficient to overcome drag of the Pod itself.

As such and in general, a s-$CO_2$ power cycle is used in a device or gas turbine engine that is more thermodynamically efficient than an open Brayton cycle. In one example, simple cycle efficiencies are above 50%, and the footprint of the power circuit itself, by operating as a s-$CO_2$ system, may be substantially reduced to 1/100 of those of traditional turbo machinery having the same power output. Air pressure ratios and temperatures may be reduced, as well, from values in more traditional systems from, for example, 12 and 1600° F. to 1.67 and 1000° F. As such, pressure ratio across a single-stage air compressor may be sufficient to maintain the much lower pressure ratio requirements compared to traditional systems. Further, heat rejection from the s-$CO_2$ power cycle into the bypass stream increases bypass stream thrust, providing yet additional opportunity for improved overall thermodynamic efficiency. Because of the significant increase in power density of the s-$CO_2$ power cycle, volumetric flow rates and overall system dimensions are likewise reduced, resulting in overall reduced engine weight, as well as initial cost and operating cost. Heat recuperation may be added, as illustrated, reducing the load on the combustor and related fuel consumption.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A gas turbine engine, comprising:
a shaft having a first air compressor coupled thereto;
a combustor positioned to receive compressed air from the first compressor;
a power source coupled to the shaft, the power source powered by a working fluid other than the compressed air, the power source including:
a second compressor coupled to the shaft;
a turbine coupled to the shaft; and
a first closed circuit that directs a working fluid from a heat exchanger, through the second compressor, through the combustor, to the turbine, and to the heat exchanger, providing power from the turbine to the shaft; and
a second closed circuit that draws the working fluid from the heat exchanger, passes the working fluid through at least one expansion device and to at least one evaporator to receive thermal load, and to at least one third compressor that is coupled to at least one related shaft.

2. The gas turbine engine of claim 1, wherein the first air compressor is a fan.

3. The gas turbine engine of claim 2, further comprising a fourth compressor coupled to the shaft and positioned to receive compressed air from the fan, and pass the compressed air to the combustor.

4. The gas turbine engine of claim 1, wherein the first closed circuit includes a recuperative heat exchanger positioned to receive the working fluid from the second compressor, and receive the working fluid from the turbine, exchanging heat therebetween.

5. The gas turbine engine of claim 1, wherein the working fluid is carbon dioxide.

6. A method of providing power, comprising:
passing compressed air from a first compressor to a combustor, wherein the first compressor is coupled to a shaft;
providing power to the shaft using a working fluid other than the compressed air;
passing the working fluid in a closed circuit from a heat exchanger to a second compressor;
passing the working fluid from the second compressor to the combustor;
passing the working fluid from the combustor to a turbine that is coupled to the shaft;
passing the working fluid from the turbine to the heat exchanger;
drawing the working fluid from the heat exchanger;
passing the drawn working fluid through at least one expansion device and to at least one evaporator;
receiving a thermal load in the working fluid, heating the working fluid that is in said at least one evaporator; and
compressing the heated working fluid from at least one said evaporator in at least one third compressor that is coupled to at least one related shaft.

7. The method of claim 6, wherein the first compressor is a fan.

8. The method of claim 7, further comprising:
receiving compressed air from the fan in a fourth compressor; and
passing the compressed air from the fourth compressor to the combustor.

9. The method of claim 6, further comprising:
receiving the working fluid from the second compressor in a recuperative heat exchanger and at a first temperature; and
receiving the working fluid from the turbine in the recuperative heat exchanger at a second temperature that is above the first temperature, increasing the temperature of the working fluid from the second compressor.

10. The method of claim 6, wherein the working fluid is carbon dioxide.

11. A device, comprising:
a shaft having a thrust-producing device coupled thereto;
a combustor positioned to receive compressed air from the thrust-producing device;
a power circuit coupled to the shaft, the power circuit powered by carbon dioxide, the power circuit including:
a carbon dioxide compressor coupled to the shaft;
a carbon dioxide turbine coupled to the shaft; and
flow lines that direct the carbon dioxide through the carbon dioxide compressor, to the combustor, to the carbon dioxide turbine, and to a heat exchanger, providing power from the carbon dioxide turbine to the shaft; and
a cooling circuit that draws the carbon dioxide from the heat exchanger, passes the carbon dioxide through at least one expansion device and to at least one evaporator to receive thermal load, and to at least one second carbon dioxide compressor that is coupled to at least one related shaft.

12. The device of claim 11, wherein the thrust-producing device is a fan.

13. The device of claim 12, further comprising an air compressor coupled to the shaft and positioned to receive compressed air from the fan, and pass the compressed air to the combustor.

14. The device of claim 11, wherein the power circuit includes a recuperative heat exchanger positioned to receive the carbon dioxide from the carbon dioxide compressor, and receive the carbon dioxide from the turbine, exchanging heat therebetween.

* * * * *